United States Patent
Hirakawa

(10) Patent No.: US 6,804,064 B2
(45) Date of Patent: Oct. 12, 2004

(54) ZOOM LENS, CAMERA, AND PORTABLE INFORMATION TERMINAL APPARATUS

(75) Inventor: Makoto Hirakawa, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 10/687,631

(22) Filed: Oct. 20, 2003

(65) Prior Publication Data

US 2004/0136087 A1 Jul. 15, 2004

(30) Foreign Application Priority Data

Oct. 23, 2002 (JP) ........................................ 2002-308860

(51) Int. Cl.$^7$ .............................................. G02B 15/14
(52) U.S. Cl. ....................... 359/682; 359/680; 359/685; 359/689; 359/716; 359/749; 359/753
(58) Field of Search ................................. 359/680–682, 359/683, 685, 689, 708, 716, 749, 753

(56) References Cited

U.S. PATENT DOCUMENTS

| | | | | |
|---|---|---|---|---|
| 4,571,031 | A | * 2/1986 | Kato | 359/680 |
| 5,153,776 | A | * 10/1992 | Nozawa | 359/676 |
| 5,262,897 | A | * 11/1993 | Kawamura | 359/689 |
| 5,764,421 | A | * 6/1998 | Shimizu et al. | 359/689 |
| 6,452,729 | B2 | * 9/2002 | Yamamoto | 359/676 |
| 6,545,819 | B1 | * 4/2003 | Nanba et al. | 359/689 |
| 2002/0122262 | A1 | * 9/2002 | Nanba | 359/689 |
| 2003/0107820 | A1 | * 6/2003 | Nanba | 359/680 |
| 2003/0133201 | A1 | * 7/2003 | Nanba et al. | 359/689 |
| 2003/0165018 | A1 | * 9/2003 | Mihara | 359/680 |
| 2003/0169509 | A1 | * 9/2003 | Iyama | 359/680 |
| 2003/0189762 | A1 | * 10/2003 | Mihara et al. | 359/680 |
| 2003/0197951 | A1 | * 10/2003 | Nanba et al. | 359/689 |
| 2004/0004772 | A1 | * 1/2004 | Ohashi et al. | 359/689 |
| 2004/0051958 | A1 | * 3/2004 | Yoneyama | 359/681 |
| 2004/0095654 | A1 | * 5/2004 | Watanabe | 359/689 |

FOREIGN PATENT DOCUMENTS

| | | |
|---|---|---|
| JP | 10-39214 | 2/1998 |
| JP | 2000-267009 | 9/2000 |

OTHER PUBLICATIONS

U.S. patent application Ser. No. 10/391,299, Ohashi et al., filed Mar. 19, 2003, pending.

\* cited by examiner

*Primary Examiner*—Evelyn A. Lester
(74) *Attorney, Agent, or Firm*—Oblon, Spivak, McClelland, Maier & Neustadt, P.C.

(57) ABSTRACT

A lens (1), a lens (2) and a lens (3) constitute a first group of lenses, a lens (4), a lens (5), a lens (6) and a lens (7) constitute a second group of lenses, and a lens (8) constitutes a third group of lenses in a zoom lens of the present invention. The second group of lenses is constituted by a first positive lens (4), a negative lens (5) which is in a meniscus shape which faces its convex shape toward a side of an object (70), a second positive lens (6) in a meniscus shape which faces its convex shape toward the object (70) side, and the third positive lens (7), which are in order from the object (70) side.

10 Claims, 15 Drawing Sheets

ZOOM LENS, CAMERA, AND PORTABLE INFORMATION TERMINAL APPARATUS

BACKGROUND OF THE INVENTION

1. Field of the Invention

The present invention relates to a zoom lens, more specifically, to the zoom lens utilizing a plastic aspheric lens.

2. Description of the Prior Art

In recent years, a market for a digital camera is expanding greatly, and the user's demand for the digital camera have been ranged in scope accordingly. That is, needless to say that not only a high image quality and a miniaturization are demanded, but also the demand for a weight saving of a zoom lens becomes greater in recent years.

There are considered various types of zoom lenses for the digital camera. As a type suited for widening an angle of view and for the miniaturization, there is a zoom lens of type which has a first group of lenses having a negative focal length, a second group of lenses having a positive focal length and a third group of lenses having a positive focal length which are arranged subsequently from a side of an object side to a side of an image, and has an aperture stop disposed at the object side of the second group of lenses that moves integrally with the second group of lenses, and in a change of magnification from a short focal end to a long focal end, the second group of lenses monotonously moves from the image side to the object side and the first group of lenses moves so as to correct a displacement of a position of image plane in accordance with the change of magnification.

For example, in Japanese Patent Laid Open No. H10-039214, there is disclosed a small-size zoom lens which a position of an exit pupil can be separated from an image plane sufficiently, has the wide angle of view and is blight, has a good performance, and yet, capable of carrying out a large change of magnification ratio. According to the small-sized zoom lens disclosed in Japanese Patent Laid Open No. H10-039214, it is constituted by arranging a first group of lenses to a third group of lenses subsequently from the object side to the image side, and the first group of lenses has a negative refractive power, the second group has a positive refractive power and the third group of lenses has the positive refractive power. It also has an aperture stop at the object side of the second group of lenses that moves integrally with the second group of lenses when carrying out a zooming, and the third group of lenses is a fixed group relating to the zooming. At the time of carrying out the zooming from a wide angle end to a telephoto end, the first group of lenses is moved to the image side on an optical axis firstly and then a direction of its movement is reversed to the object side on the way so that the first group of lenses is moved to the image side in such a manner as to draw a convex-like arc shape to correct a displacement in an focusing position, and the second group of lenses is moved monotonously to the object side on the optical axis to carry out the change of magnification.

Also, in Japanese Patent Laid Open 2000-267009, a small sized, high image quality and inexpensive zoom lens which arranges a plastic lens for a zoom lens which has a negative-positive two-element zoom lens effectively and which is particularly suited for a digital still camera, is disclosed. According to the zoom lens disclosed in Japanese Patent Laid Open 2000-267009, at least one of lenses constitutes each group of lenses in a zoom lens having negative-positive-positive three-element lens seen from the object side is the plastic lens, and it also has a structure which a following conditional formula is satisfied: $-0.8<Cp\times(N'-N)/\phi W<0.8$, $-0.45<M3/M2<0.90$ (where $\phi T/\phi W>1.6$) where Cp is a curvature of the plastic lens, $\phi W$ is a power of entire system at the wide angle end, N and N' are the object side of an aspheric surface and an refraction index of d-line of medium at the image side, M2 and M3 show amounts of movements of the second group of lenses and the third group of lenses respectively (using the wide angle end as the base and setting the object side as −), and $\phi T$ is the power of entire system at the telephoto end.

The above mentioned Japanese Patent Laid Open No. H10-039214 was filed at the earliest time as the above zoom lens of such type, and a basic structure of the above zoom lens of such type is all disclosed. However, since all the lenses are made from glass, it cannot be said that the sufficient weight saving is achieved.

Also, Japanese Patent Laid Open 2000-267009 provides the zoom lens utilizing a plastic aspheric lens. However, the second group of lenses having a function of the change of magnification and an imaging function which are most influential on an aberration correction function is a triplets type in the embodiment described in Japanese Patent Laid Open 2000-267009, therefore there is a problem that it has no sufficient aberration correction function.

SUMMARY OF THE INVENTION

The present invention has been made in view of the aforementioned problems, and therefore it is an object of the present invention to provide a zoom lens which is small sized, light weighted and has a wide angle of view by using a plastic aspheric lens while having high performance equivalent to or more than conventional zoom lenses.

To accomplish the aforementioned object, a zoom lens according to a first aspect of the present invention comprises a first group of lenses having a negative refractive power, a second group of lenses having a positive refractive power and a third group of lenses having the positive refractive power, and an aperture stop provided at an object side of the second group of lenses. In addition, a first positive lens, a negative lens, a second positive lens and a third positive lens are subsequently arranged from the object side to the image side in the second group of lenses. Furthermore, when a zooming from a short focal end to a long focal end is carried out, the second group of lenses is monotonously moved from an image side to the object side, and the first group of lenses is moved so as to correct a displacement of a position of image plane in accordance with the zooming, and at least the third positive lens positioned nearest to the image side is a plastic aspheric lens.

Also, according to a second aspect of the present invention, the negative lens is formed by a negative lens in a meniscus shape which faces its convex surface toward the object side. In addition, the second positive lens is formed by a positive lens in a meniscus shape which faces its convex surface toward the object side.

In the zoom lens of the present invention, the first group of lenses to the third group of lenses are arranged subsequently from the object side to the image side. The first group of lenses has the "negative refractive power", the second group of lenses has the "positive refractive power" and the third group of lenses has the "positive refractive power." The aperture stop provided at the object side of the second group of lenses moves integrally with the second group of lenses when carrying out the zooming. In addition, when carrying out the zooming from a wide angle end to a telephoto end, the first group of lenses is moved to the image side on an optical axis firstly and then a direction of its movement is reversed to the object side on the way so that the first group of lenses is "moved to the image side in such a manner as to draw a convex-like arc shape" to correct a displacement in an focusing position, and the second group of lenses is moved monotonously to the object side on the optical axis, to carry out the change of magnification. Also, since the aperture stop is moved integrally with the second group of lenses when carrying out the zooming, the movement of the second group of lenses is not hindered by the aperture stop. The most characteristic of the present invention is that at least the third positive lens positioned nearest to the image side is the plastic aspheric lens.

According to this invention, because the plastic aspheric lens is used for the second group of lenses with a conventional structure of the zoom lens, the small sized camera (portable information terminal apparatus) which is lighter weighted and more convenient to use than the conventional ones and capable of widening the angle of view can be realized while having the high performance and in small size equivalent to or more than the conventional ones.

Also, according to a third aspect of the present invention, a following conditional formula is satisfied:

$$0.08 < f_2/f_{2p} < 0.8$$

if a focal length of the second group of lenses is $f_2$, and the focal length of the third positive lens is $f_{2p}$.

By providing the second group of lenses to have two pieces of the positive lenses to the image side, power can be weakened per one piece in the zoom lens of the present invention. Generally, although the plastic lens is known to have a tendency that the position of image plane or the like is easily be displaced by an environmental variation, the plastic lens in the present invention becomes difficult to be influenced by the environmental variation by introducing such lens having relatively weak power, as a result, the widening of angle of view in photographing angle of view and the weight saving of a lens system can be accomplished together. Here, a focal length of the plastic aspheric lens is desired to satisfy the conditional formula described in the present invention.

According to this invention, since the focal length of the plastic aspheric lens is designed to satisfy the aforementioned conditional formula, the zoom lens which has the high performance and difficult to be influenced by the environmental variation even more can be provided.

Also, according to the forth aspect of the present invention, at least the negative lens of the second group of lenses and the second positive lens are jointed.

In order to reduce performance degradation by an error in assembling the lens in the zoom lens of the present invention, it is preferred to join the negative lens of the second group of lenses with the second positive lens in the image side thereof.

According to this structure, since the negative lens of the second group of lenses and the second positive lens in the image side thereof are jointed, the zoom lens having simpler structure with less performance degradation can be provided.

Also, according to a fifth aspect of the present invention, a following conditional formula is satisfied:

$$0.8 < R_c/Y_{max} < 1.2$$

if a radius of curvature in a jointed surface of the second group of lenses is $R_c$, and a maximum image height is $Y_{max}$.

Although the aberration in directions mutually counteracting at a surface of the image side of the negative lens and at a surface of the object side of the second positive lens is largely generated and therefore degradation of image performance by a relative de-centering of the two lenses is large, such degradation of image performance can be avoided by joining the negative lens with the second positive lens. In order to attain the zoom lens having the high performance even more when joining the negative lens with the second positive lens, it is desired to satisfy the conditional formula in the present invention.

According to this invention, since the design is made to satisfy the conditional formula, the zoom lens having the high performance and simple structure can be provided.

Also, according to a sixth aspect of the present invention, the aperture stop provided at the object side of the second group of lenses moves integrally with the second group of lenses, and at least a surface of the second group of lenses that is nearest to the object side is an aspheric surface.

To provide the zoom lens of the present invention to be further simplified and in high performance even more, it is desired to provide the aperture stop which moves integrally with the second group of lenses at the object side of the second group of lenses and set at least the object side surface in the lens at nearest to the object side of the second group of lenses to be aspheric surface.

According to this invention, because the aperture stop which moves integrally with the second group of lenses is provided and at least the object side surface in the lens at the nearest to the object side of the second group of lenses is set to be aspheric surface, the zoom lens which an aspheric aberration is less can be provided, as a result, the camera (portable information terminal apparatus) having even higher image quality can be realized.

Also, according to a seventh aspect of the present invention, at least one piece of plastic aspheric lens, whose both surfaces thereof are aspheric surfaces, is provided.

Although more aspheric surfaces may be provided in order to improve the aberration correction function even more, if a lens which has the aspheric surfaces on both sides thereof are introduced by using a high degree of freedom in processing the plastic lens, great effect in terms of efficiency can be attained.

According to this invention, because at least one piece of the plastic aspheric lens is provided, the zoom lens which is superior in the aberration correction function can be provided.

Also, according to an eighth aspect of the present invention, the first group of lenses is provided with a plastic aspheric lens, and the third group of lenses is provided with a plastic aspheric lens.

A large number of plastic lenses may be used in order to pursue more weight saving of the zoom lens in the present invention, but there is no so much choice for the plastic which can be used as the lens compared with an optical glass in terms of a refraction index and dispersion. Accordingly, the aberration correction function deteriorates if the excessive plastic lenses are used in the same group of lenses rather than raising the aberration correction function. To take a balance between the weight saving and the aberration correction function efficiently while avoiding the deterioration in the aberration correction function, it is preferred to adopt a method in which the plastic aspheric lenses distribute to each of the group of lenses.

More specifically, in one of the zoom lens in the present invention, the third positive lens which the second group of lenses provides is the plastic aspheric lens, the first group of lenses provides at least one plastic aspheric lens, and the third group of lenses provides at least one plastic aspheric lens.

According to this invention, since the plastic aspheric lenses are distributed to each of the group of lenses, even lighter zoom lens can be provided.

According to a ninth aspect of the present invention, the zoom lens described in the above first aspect is provided as a photographing optical system.

According to this invention, since the zoom lens which can be miniaturized even more and has the high performance equivalent to or more than the conventional ones is used for a photographing optical system, the camera which is small in size and has the high image quality can be provided, as a result, the user can photograph the high quality image by using the camera which is superior in portability.

Also, according to a tenth aspect of the present invention, the zoom lens described in the first aspect is provided as a photographing optical system of a camera function section.

According to this invention, because the zoom lens which can be miniaturized even more and has the high performance equivalent to or more than the conventional ones is used for a photographing optical system of the camera function section, the portable information terminal apparatus which is small in size and has the high image quality can be provided, as a result, the user can photograph the high quality image by using the portable information terminal apparatus which is superior in portability, and can transmit the photographed image to outside.

DESCRIPTION OF THE PREFERRED EMBODIMENTS

Hereinafter, a specific description of the present invention will be explained by using embodiments shown in the accompanying drawings. However, components, types, combinations, configurations or their relative arrangements which are described in the present embodiments are not intended to limit the scope of the present invention, rather, they are merely explanatory examples unless otherwise specifically stated.

Figure 1:
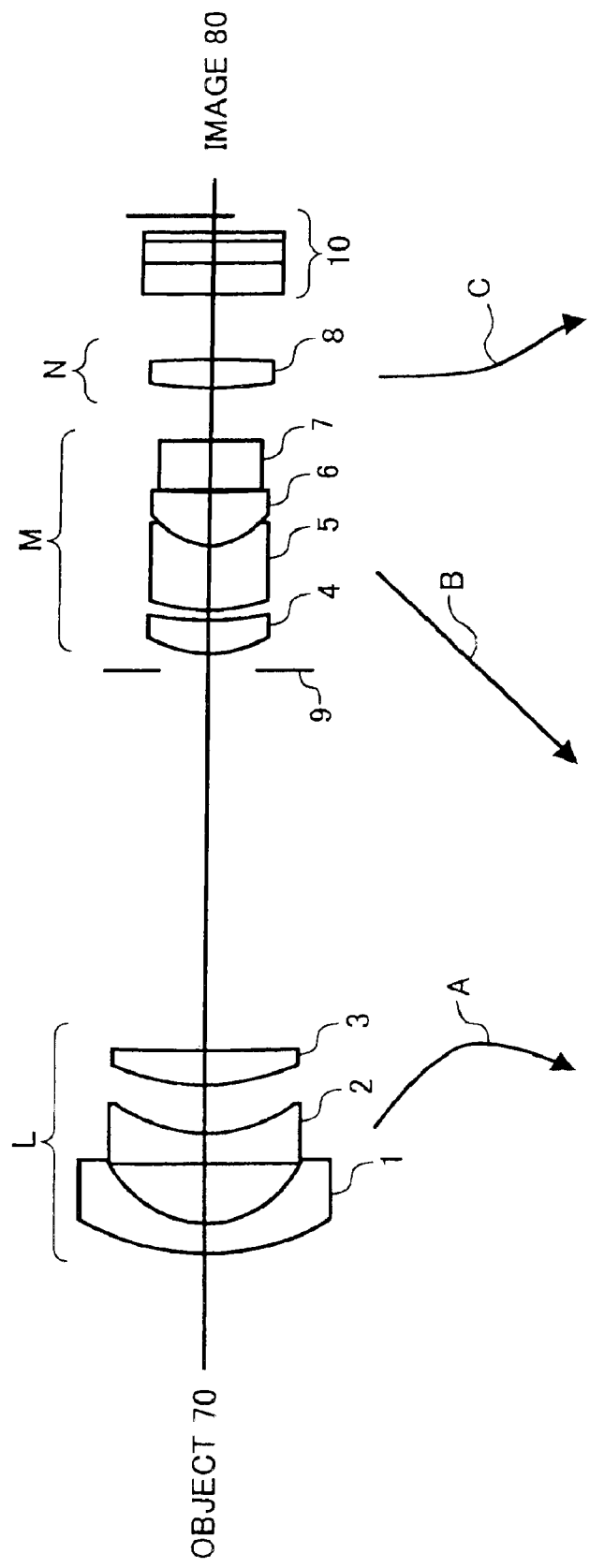
FIG. 1 is a cross sectional view showing a structure of a zoom lens in an embodiment of numeric value 1 of the present invention.
Figure 2:
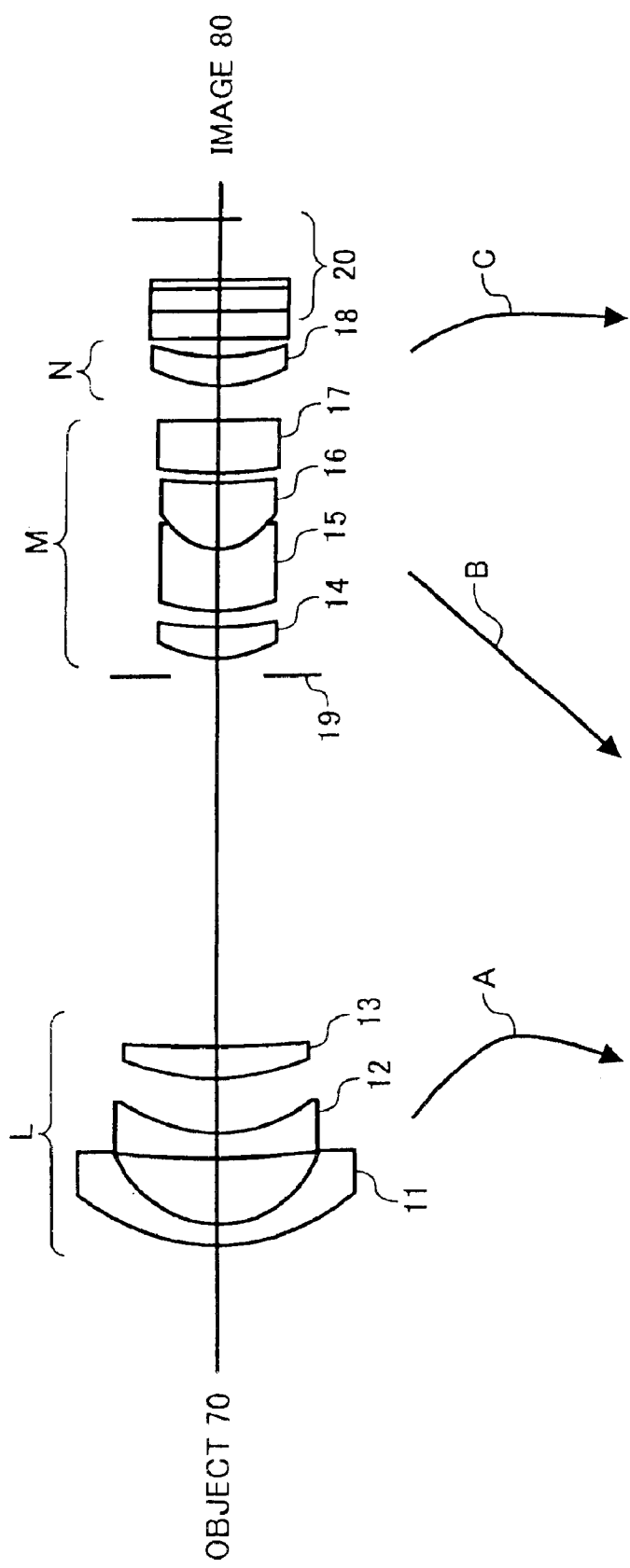
FIG. 2 is a cross sectional view showing a structure of a zoom lens in an embodiment of numeric value 2 of the present invention.
Figure 3:
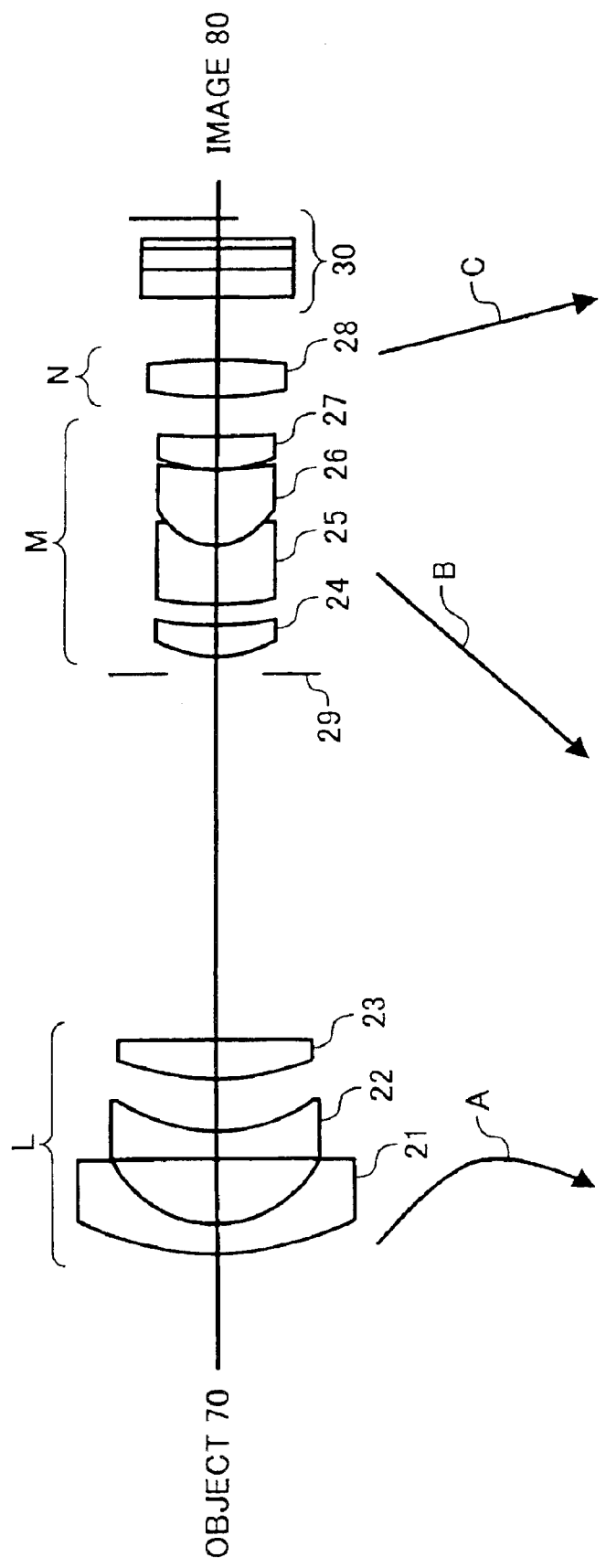
FIG. 3 is a cross sectional view showing a structure of a zoom lens in an embodiment of numeric value 3 of the present invention.

As shown in FIGS. 1 to 3, generally in a zoom lens constituted by three groups of lenses L, M and N which are arranged by negative-positive-positive subsequently in this order, the second group of lenses M monotonously moves from a side of an image 80 to a side of an object 70 in such a manner shown by an arrow B when a change of magnification from a short focal end to a long focal end is carried out, and the first group of lenses L is moved in such a manner shown by an arrow A so as to correct displacement of a position of image plane in accordance with the change of magnification. The second group of lenses M plays a role in most of a function of the change of magnification, and the third group of lenses N is provided mainly for separating an exit pupil away from an image plane. In order to promote further miniaturization in the zoom lens of such, a power in each of the group of lenses, particularly the power in second group of lenses M which is as a group of change of magnification, has to be enhanced. Accordingly, a fine aberration correction is required to be carried out in the second group of lenses M.

In the present invention, as referring to FIG. 1, the second group of lenses M is constituted by a first positive lens 4, a negative lens 5, a second positive lens 6 and a third positive lens 7 subsequently from the object 70 side in order. Particularly in the present embodiments, the aforementioned negative lens 5 is formed as a negative lens in a meniscus shape which faces its convex surface toward the object 70 side, and the aforementioned second positive lens 6 is formed as a positive lens in the meniscus shape which faces its convex surface toward the object 70 side. Although this composition is based on so-called a triplets structure which the positive lenses are arranged at both sides of the negative lens, a degree of freedom of correction in an off axis aberration is increased by dividing into the positive lenses 6 and 7 at the image 80 side which an off axis light departs from an optical axis. Accordingly, it is possible to correct a coma aberration and astigmatism or the like effectively even if a photographing angle of view is turned into wide angle of view.

Also, by dividing into the positive lenses 6 and 7 which are at the image 80 side, a power per one piece can be weakened. Generally, although a plastic lens is known to have a tendency that the position of image plane or the like is easily be displaced by an environmental variation, the plastic lens in the present invention becomes difficult to be influenced by the environmental variation by introducing such lens having relatively weak power, as a result, the widening of angle of view in photographing angle of view and weight saving of lens system can be accomplished together. Here, a focal length of a plastic aspheric lens is desired to satisfy a following conditional formula:

$$0.08 < f_2/f_{2p} < 0.8$$

where $f_2$ represents the focal length of the second group of lenses M, and $f_{2p}$ represents the focal length of the plastic aspheric lens in the second group of lenses M that is nearest to the image 80 side. In addition, if $f_2/f_{2p}$ becomes below 0.08, the power in the plastic aspheric lens becomes relatively too small, and therefore, there is not so much point in adding the lenses. If $f_2/f_{2p}$ becomes over 0.8, the lens becomes such a lens that easily be influenced by the environmental variation because of the power being relatively too strong, and therefore, the fine aberration correction becomes difficult to be carried out. It is further desirable to satisfy a following conditional formula:

$$0.1 < f_2/f_{2p} < 0.7$$

Also, in order to reduce performance degradation by an error in assembling the lens in the zoom lens of the present invention, it is preferred to join the negative lens 5 which is in the meniscus shape of the second group of lenses M with the second positive lens 6 which is in the meniscus shape of the image side thereof. More specifically, although the aberration in directions mutually counteracting at a surface of the image 80 side of the negative lens 5 and at a surface of the object 70 side of the second positive lens 6 is largely generated and therefore degradation of image performance by a relative de-centering of these two lenses is large, such degradation of image performance can be avoided by joining the negative lens 5 with the second positive lens 6, that is, joining the both meniscus lenses. In order to attain the zoom lens having the high performance even more when joining the both meniscus lenses, it is desired to satisfy a following conditional formula.

$$0.8 < R_c/Y_{max} < 1.2$$

where $R_c$ represents radius of curvature in the jointed surface, $Y_{max}$ represents a maximum image height, respectively. However, when $R_c/Y_{max}$ is below 0.8, then the power at the jointed surface becomes too large and as a result, the aberration becomes difficult to be balanced, and when $R_c/Y_{max}$ is over 1.2, the power at the jointed surface becomes too small, as a result, the sufficient aberration correction function cannot be obtained. Therefore, the fine aberration correction becomes difficult to be carried out in both ways. It is further desirable to satisfy a following conditional formula:

$$0.9 < R_c/Y_{max} < 1.1$$

Also, to provide the zoom lens of the present invention to be further simplified and in high performance even more, it is desired to provide an aperture stop 9 which integrally moves with the second group of lenses M at the object 70 side of the second group of lenses M and set at least the surface of the object 70 side in the first positive lens 4 nearest to the object 70 side of the second group of lenses M to be aspheric surface. More specifically, since the surface of the second group of lenses M at the nearest to the object 70 side is in proximity to the aperture stop, and a marginal light has sufficient height and also a change in height of light by a zooming is less, it is possible to correct a spherical aberration which is a basis of an imaging performance more finely by providing the aspheric surface at the aforementioned surface of the second group of lenses M at the nearest to the object 70 side.

In addition, although more aspheric surfaces may be provided in order to improve the aberration correction function even more, if a lens having the aspheric surfaces on both sides thereof is introduced by using a high degree of freedom in processing the plastic lens, great effect in terms of efficiency can be attained.

Also, a large number of plastic lenses may be used in order to pursue more weight saving of the zoom lens in the present invention, but there is not so much choice for the plastic which can be used as the lens compared with an optical glass in terms of refraction index and dispersion. Accordingly, the aberration correction function deteriorates if the excessive plastic lenses are used in the same group of lenses rather than raising the aberration correction function. To take a balance between the weight saving and the aberration correction function efficiently while avoiding the deterioration in the aberration correction function, it is preferred to adopt a method in which the plastic aspheric lenses distribute to each of the group of lenses from the first to the third groups of lenses. That is, it is preferred for the weight saving if the third positive lens which the second group of lenses M provides being provided as the plastic aspheric lens, and at least one piece among the second group of lenses L being provided as the plastic aspheric lens and at least one piece among the third group of lenses N being provided as the plastic aspheric lens.

Specific embodiments of numeric values according to the zoom lens of the present invention are shown hereunder. The aberrations in the present embodiments are sufficiently corrected, thereby making it possible to correspond to a light receiving element of 2,000,000 pixels to 4,000,000 pixels. By constituting the zoom lens as in the present invention, it is possible to accomplish the fine image performance while achieving a sufficient miniaturization. Also, in any one of the embodiments, the lens 2 of the first group of lenses L, the lens 7 of the second group of lenses M positioned nearest to the image 80 side (that is, the third positive lens) and the lens 8 of the third group of lenses N are plastic aspheric lenses. Furthermore, the second group of lenses M is monotonously moved from the image 80 side to the object 70 side in such a manner shown by the arrow B, and the first group of lenses L is moved in such a manner shown by the arrow A so as to correct the displacement of the position of image plane in accordance with the change of magnification.

Meaning for signs in each embodiment are as follows.

f: Focal length of entire system
F: F number
ω: Half angle of view
R: Radius of curvature
D: Face interval
$N_d$: Refraction index
$v_d$: Abbe number
K: Conical constant of aspherical surface
$A_4$: Fourth-order aspherical coefficient
$A_6$: Sixth-order aspherical coefficient
$A_8$: Eighth-order aspherical coefficient
$A_{10}$: Tenth-order aspherical coefficient
$A_{12}$: Twelfth-order aspherical coefficient
$A_{14}$: Fourteenth-order aspherical coefficient
$A_{16}$: Sixteenth-order aspherical coefficient
$A_{18}$: Eighteenth-order aspherical coefficient The aspherical surface used here is defined in the following formula:

$$X = \{CH^2/1 + \sqrt{(1-(1+K)C^2H^2)}\} + A_4 \cdot H^4 + A_6 \cdot H^6 + A_8 \cdot H^8 + A_{10} \cdot H^{10} + A_{12} \cdot H^{12} + A_{14} \cdot H^{14} + A_{16} \cdot H^{16} + A_{18} \cdot H^{18}$$

where an inverted number of a proximal axis curvature radius (proximal axis curvature) is C, and the height of the optical axis is H.

FIG. 1 is a cross sectional view showing the structure of the zoom lens in the first embodiment of the present invention. The zoom lens in the first embodiment of the present invention is constituted by a lens 1, a lens 2, a lens 3, the first positive lens 4, the negative lens 5 in the meniscus shape, the second positive lens 6 in the meniscus shape, the third positive lens 7, the lens 8, the aperture stop 9 and a filter 10, which are arranged from the object side 70 to the image 80 side. In addition, the lens 1, the lens 2 and the lens 3 constitute the first group of lenses L, the first positive lens 4, the negative lens 5, the second positive lens 6 and the third positive lens 7 constitute the second group of lenses M, and the lens 8 constitutes the third group of lenses N. The embodiment of numeric value of those will be described hereunder.

Embodiment of Numeric Value 1 f=5.97–16.88, F=2.76–4.54 ω=39.20–15.32

Aspherical Surface; Fifteenth Surface
K=0.0, A4=−0.959689×10⁻⁴, A6=0.496504×10⁻⁵, A8=−0.221147×10⁻⁶
A10=0.425230×10⁻⁸

Variable Interval

|   | Short focal end f = 5.97 | middle focal length f = 10.05 | long focal end f = 16.88 |
|---|---|---|---|
| A | 21.264 | 8.776 | 1.500 |
| B | 2.913 | 7.525 | 15.720 |
| C | 3.610 | 3.605 | 3.101 |

Value of Conditional Formula $f_2/f_{2p}=0.144$ $R_c/Y_{max}=1.075$

Figure 4:
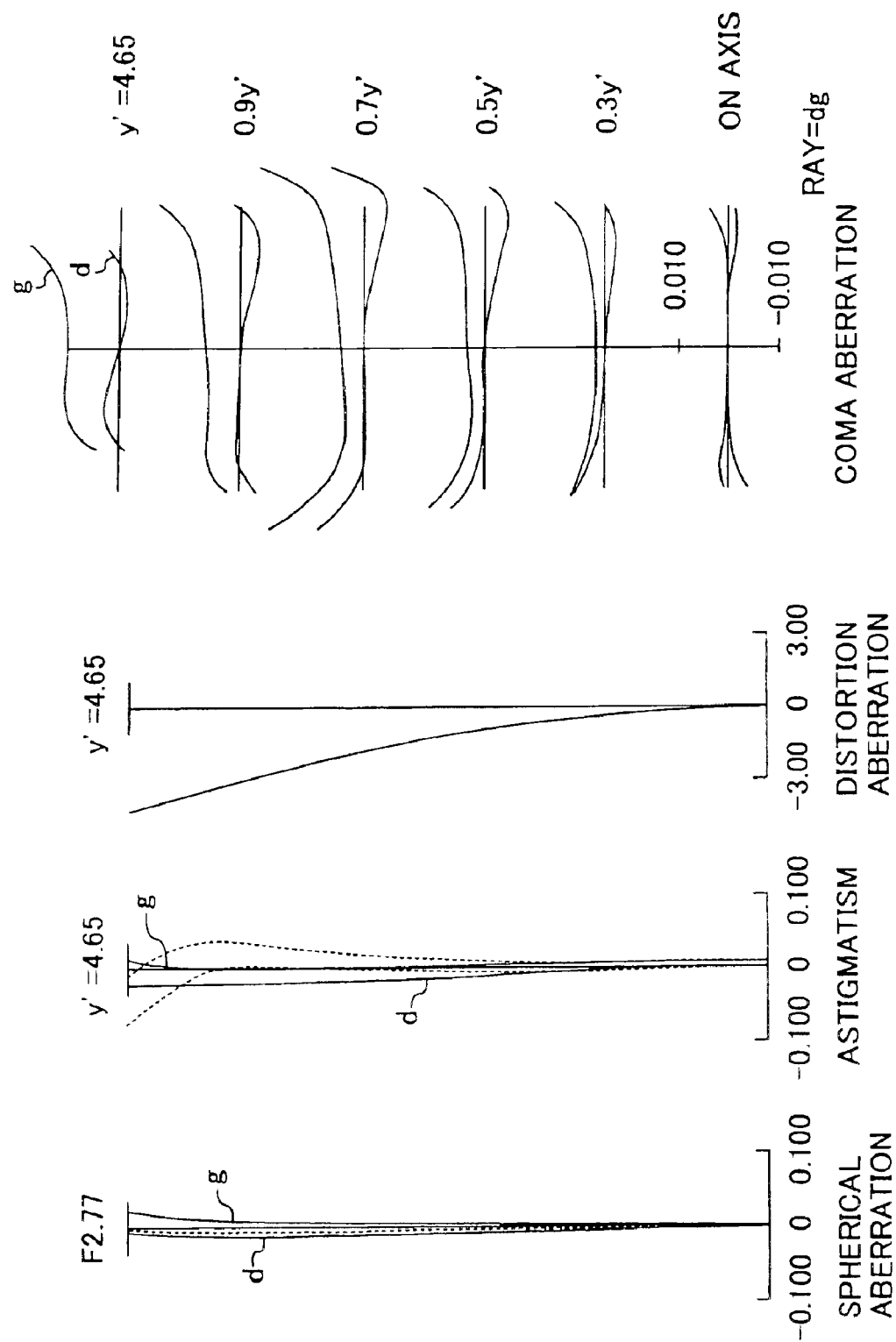
FIG. 4 is an aberration curve diameter in a short focal end of the zoom lens in the embodiment of numeric value 1 of the present invention.
Figure 5:
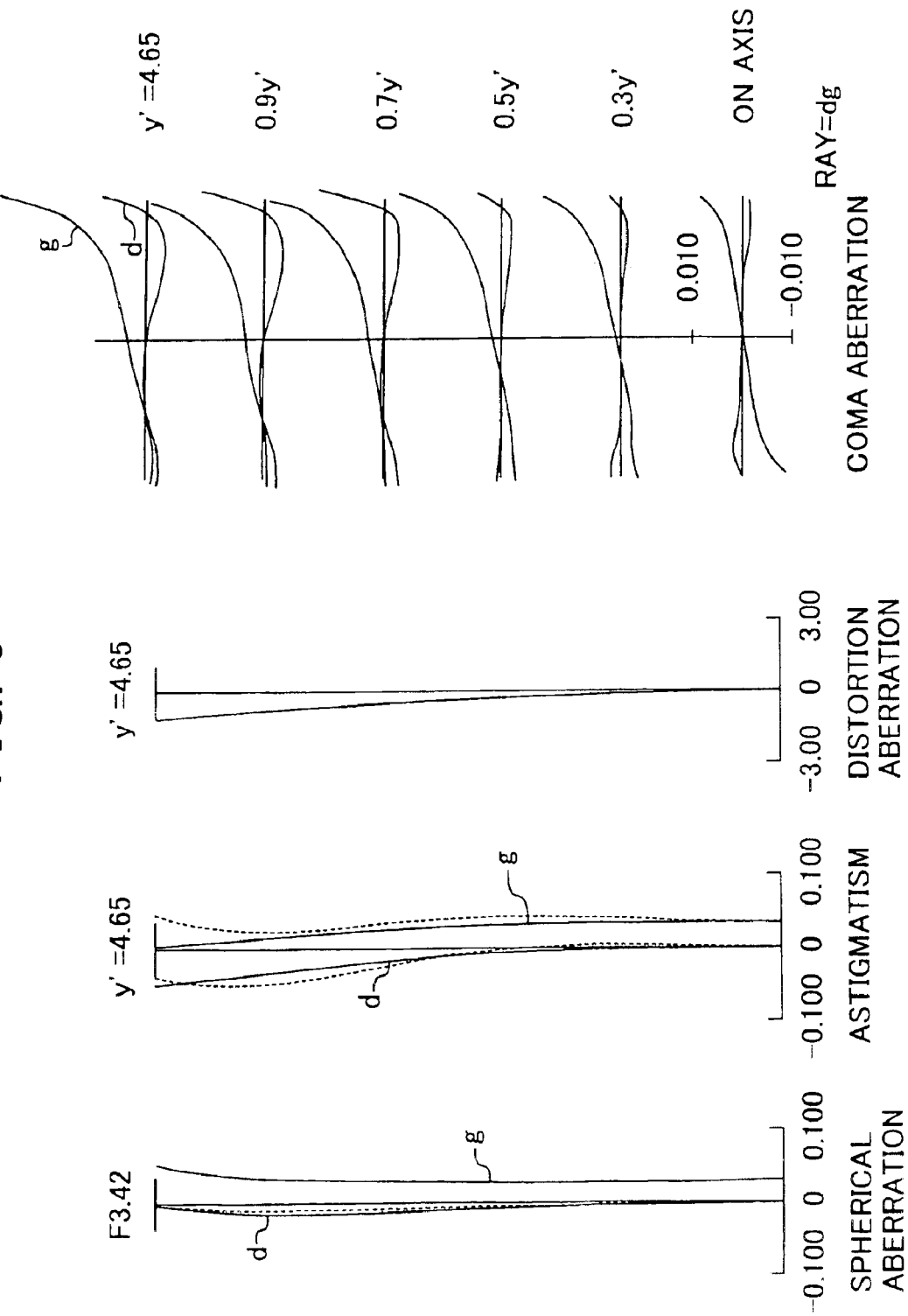
FIG. 5 is an aberration curve diameter in a middle focal length of the zoom lens in the embodiment of numeric value 1 of the present invention.
Figure 6:
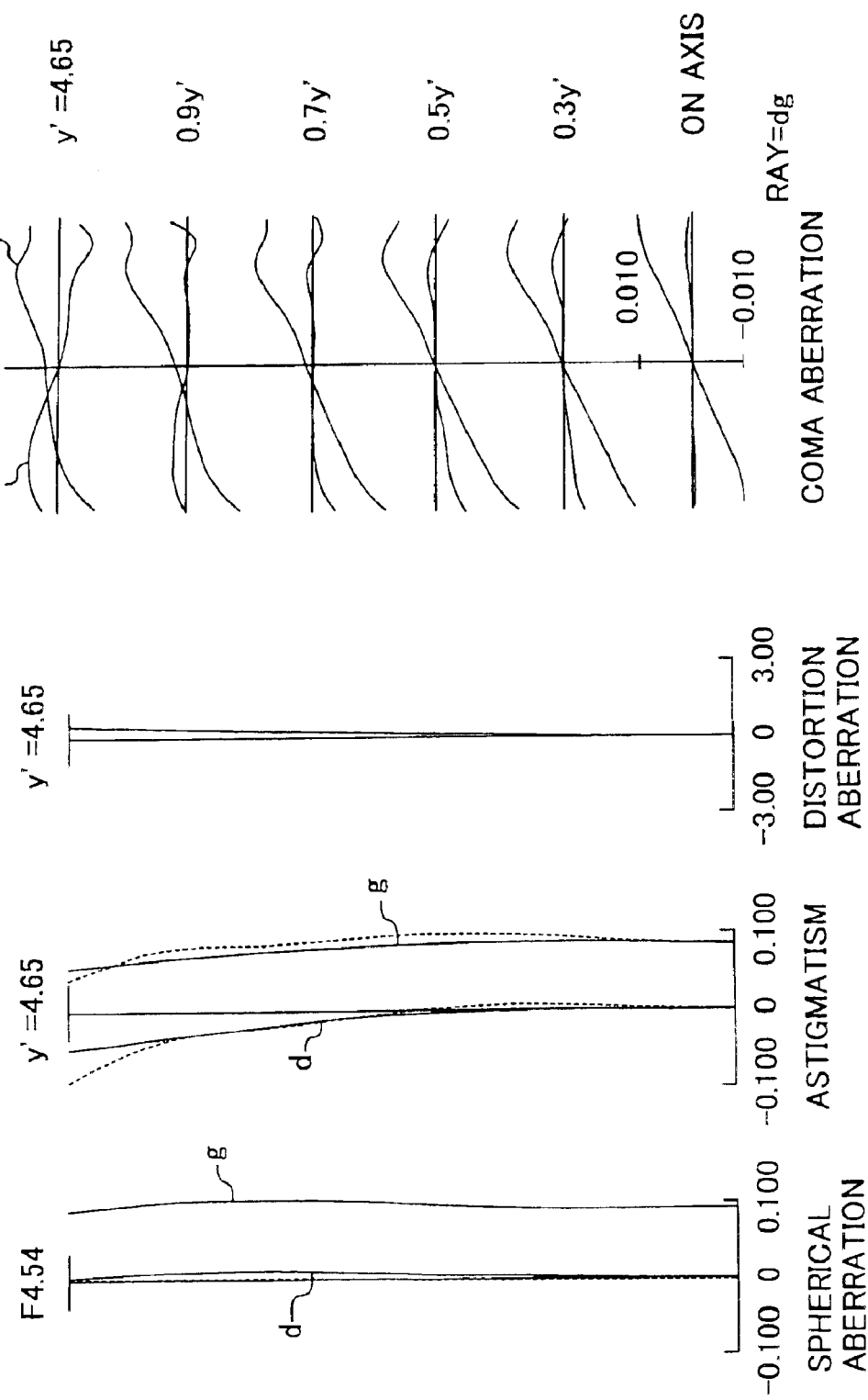
FIG. 6 is an aberration curve diameter in a long focal end of the zoom lens in the embodiment of numeric value 1 of the present invention.

FIG. 4 is an aberration curve diameter in the short focal end of the zoom lens according to the embodiment of numeric value 1, FIG. 5 is an aberration curve diameter in the middle focal length of the zoom lens according to the embodiment of numeric value 1, and FIG. 6 is an aberration curve diameter in the long focal end of the zoom lens according to the embodiment of numeric value 1.

FIG. 2 is a cross sectional view showing a zoom lens in a second embodiment of the present invention. The zoom

| Surface No. | R | D | Nd | ν d | Remarks | |
|---|---|---|---|---|---|---|
| 01 | 20.817 | 1.67 | 1.77250 | 49.62 | Lens 1 | ⎫ |
| 02 | 7.903 | 3.31 | | | | |
| 03 | −244.273 | 1.61 | 1.53048 | 55.78 | Lens 2 | ⎬ First group of lenses L |
| 04* | 9.234 | 2.74 | | | | |
| 05 | 17.550 | 2.14 | 1.71740 | 29.50 | Lens 3 | ⎭ |
| 06 | −592.689 | Variable (A) | | | | |
| 07 | aperture stop | 1.00 | | | | |
| 08* | 8.831 | 1.75 | 1.74330 | 49.33 | First positive lens 4 | ⎫ |
| 09 | 31.256 | 0.54 | | | | |
| 10 | 14.025 | 3.67 | 1.84700 | 23.80 | Negative lens 5 | ⎬ Second group of lenses M |
| 11 | 5.000 | 2.95 | 1.48750 | 70.44 | Second positive lens 6 | |
| 12 | 56.891 | 0.11 | | | | |
| 13 | 69.906 | 2.82 | 1.53048 | 55.78 | Third positive lens 7 | ⎭ |
| 14* | −216.903 | Variable (B) | | | | |
| 15* | 29.711 | 1.62 | 1.53048 | 55.78 | Lens 8} Third group of lenses N | |
| 16 | −133.022 | Variable (C) | | | | |
| 17 | ∞ | 3.32 | 1.51680 | 64.20 | Various filters | |
| 18 | ∞ | | | | | |

Aspherical Surface; Fourth Surface
K=0.0, A4=−0.28631010×10⁻³, A6=−0.500552×10⁻⁵, A8=0.418669×10⁻⁶
A10=−0.246109×10⁻⁷, A12=0.613238×10⁻⁹, A14=−0.179780×10⁻¹¹
A16=−0.200092×10⁻¹², A18=0.266967×10⁻¹⁴

Aspherical Surface; Eighth Surface
K=0.0, A4=−0.756502×10⁻⁴, A6=−0.714045×10⁻⁶, A8=0.772288×10⁻⁸
A10=−0.759411×10⁻⁹

Aspherical Surface; Fourteenth Surface
K=0.0, A4=0.363652×10⁻³, A6=0.113628×10⁻⁴, A8=0.796657×10⁻⁶
A10=0.384502×10⁻⁷ lens in the second embodiment of the present invention is constituted by a lens 11, a lens 12, a lens 13, a first positive lens 14, a negative lens 15 which is in the meniscus shape, a second positive lens 16 in the meniscus shape, a third positive lens 17, a lens 18, an aperture stop 19 and a filter 20, which are arranged from the object 70 side to the image 80 side. In addition, the lens 11, the lens 12 and the lens 13 constitute the first group of lenses L, the first positive lens 14, the negative lens 15, the second positive lens 16 and the third positive lens 17 constitute the second group of lenses M, and the lens 18 constitutes the third group of lenses N. The embodiment of numeric value of those will be described hereunder.

Embodiment of Numeric Value 2 f=5.97–16.88, F=2.78–4.47 ω=39.13–15.48

| Surface No. | R | D | Nd | ν d | Remarks | |
|---|---|---|---|---|---|---|
| 01 | 14.775 | 1.21 | 1.80420 | 46.50 | Lens 11 | ⎫ |
| 02 | 7.448 | 3.77 | | | | ⎪ |
| 03* | 56.813 | 1.41 | 1.53048 | 55.78 | Lens 12 | ⎬ First group of lenses L |
| 04* | 8.551 | 3.06 | | | | ⎪ |
| 05 | 17.779 | 1.88 | 1.84666 | 23.78 | Lens 13 | ⎭ |
| 06 | 50.274 | Variable (A) | | | | |
| 07 | aperture stop | 1.00 | | | | |
| 08* | 7.718 | 1.75 | 1.74330 | 49.33 | First positive lens 14 | ⎫ |
| 09 | 18.026 | 1.00 | | | | ⎪ |
| 10 | 13.857 | 3.39 | 1.80518 | 25.46 | Negative lens 15 | ⎪ |
| 11 | 4.650 | 3.76 | 1.48749 | 70.44 | Second positive lens 16 | ⎬ Second group of lenses M |
| 12 | 24.198 | 0.50 | | | | ⎪ |
| 13* | 14.578 | 3.00 | 1.58910 | 61.30 | Third positive lens 17 | ⎭ |
| 14* | 122.346 | Variable (B) | | | | |
| 15* | 10.918 | 1.58 | 1.53048 | 55.80 | Lens 18} Third group of lenses N | |
| 16 | 16.371 | Variable (C) | | | | |
| 17 | ∞ | 3.33 | 1.51680 | 64.20 | Various filters | |
| 18 | ∞ | | | | | |

Aspherical Surface; Third Surface
K=0.0, A4=−0.210448×10$^{-3}$, A6=0.504148×10$^{-5}$, A8=−0.242816×10$^{-7}$
A10=−0.656401×10$^{-10}$,
Aspherical Surface; Fourth Surface
K=0.0, A4=−0.549100×10$^{-3}$, A6=−0.135386×10$^{-5}$, A8=0.453082×10$^{-6}$
A10=−0.260541×10$^{-7}$, A12=0.587680×10$^{-9}$, A14=−0.113968×10$^{-11}$
A16=−0.192632×10$^{-12}$, A18=0.236265×10$^{-14}$
Aspherical Surface; Eighth Surface
K=0.0, A4=−0.889606×10$^{-4}$, A6=−0.165729×10$^{-5}$, A8=0.46209079×10$^{-7}$, A10=0.247332×10$^{-8}$
Aspherical Surface; Thirteenth Surface
K=0.0, A4=−0.487327×10$^{-3}$, A6=−0.141052×10$^{-4}$, A8=0.540166×10$^{-6}$, A10=0.375653×10$^{-8}$
Aspherical Surface; Fourteenth Surface
K=0.0, A4=−0.161674×10$^{-3}$, A6=−0.859375×10$^{-5}$, A8=−0.733020×10$^{-6}$, A10=0.244131×10$^{-7}$
Aspherical Surface; Fifteenth Surface
K=0.0, A4=−0.785817×10$^{-4}$, A6=0.108028×10$^{-5}$, A8=−0.655020×10$^{-7}$, A10=0.131296×10$^{-8}$
Variable Interval

| | Short focal end f = 5.97 | middle focal length f = 10.05 | long focal end f = 16.88 |
|---|---|---|---|
| A | 21.111 | 8.942 | 1.606 |
| B | 1.926 | 6.892 | 14.611 |
| C | 3.290 | 3.100 | 3.100 |

Value of Conditional Formula $f_2/f_{2p}$=0.464

$R_c/Y_{max}$=1.000

Figure 7:
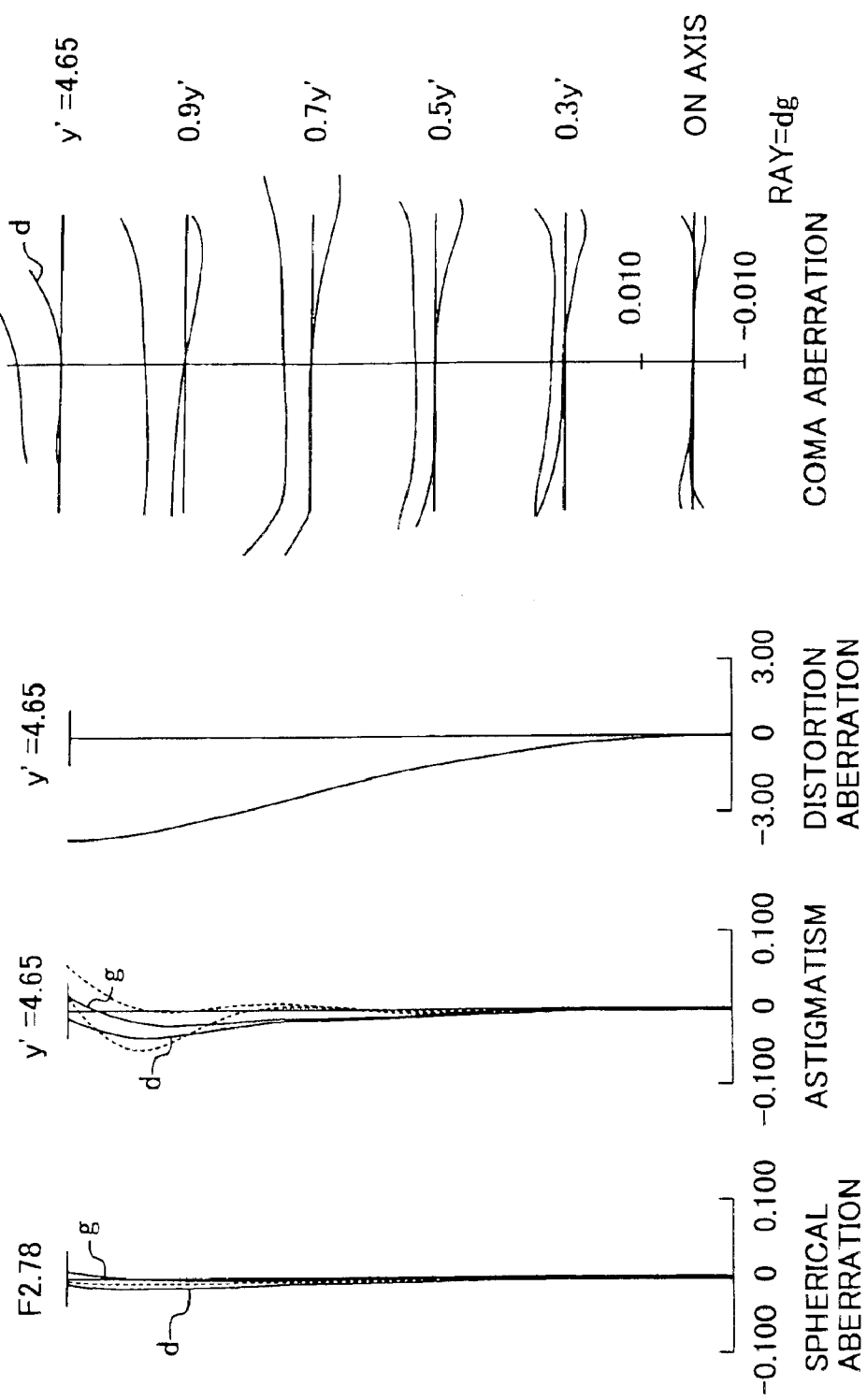
FIG. 7 is an aberration curve diameter in the short focal end of the zoom lens in the embodiment of numeric value 2 of the present invention.
Figure 8:
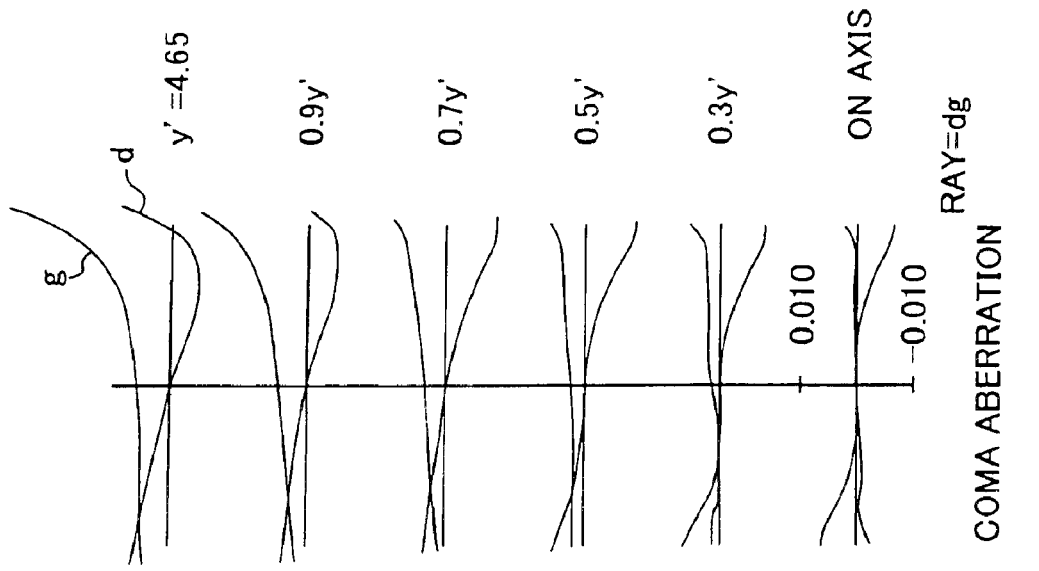
FIG. 8 is an aberration curve diameter in the middle focal length of the zoom lens in the embodiment of numeric value 2 of the present invention.
Figure 8:
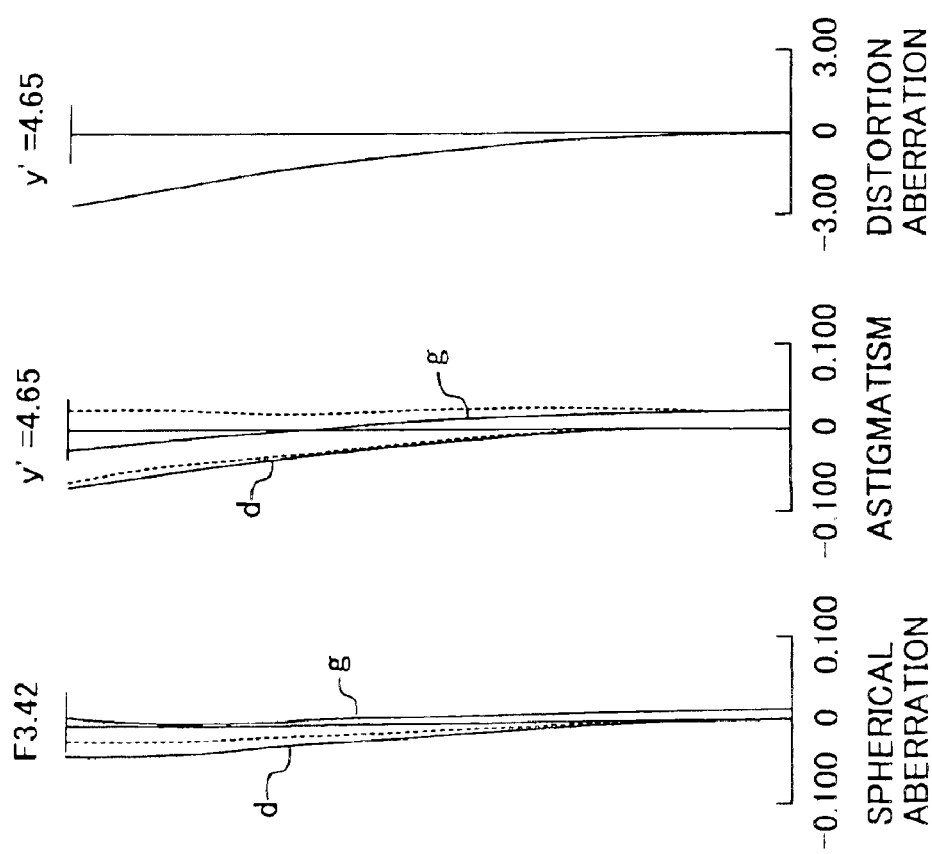
Figure 9:
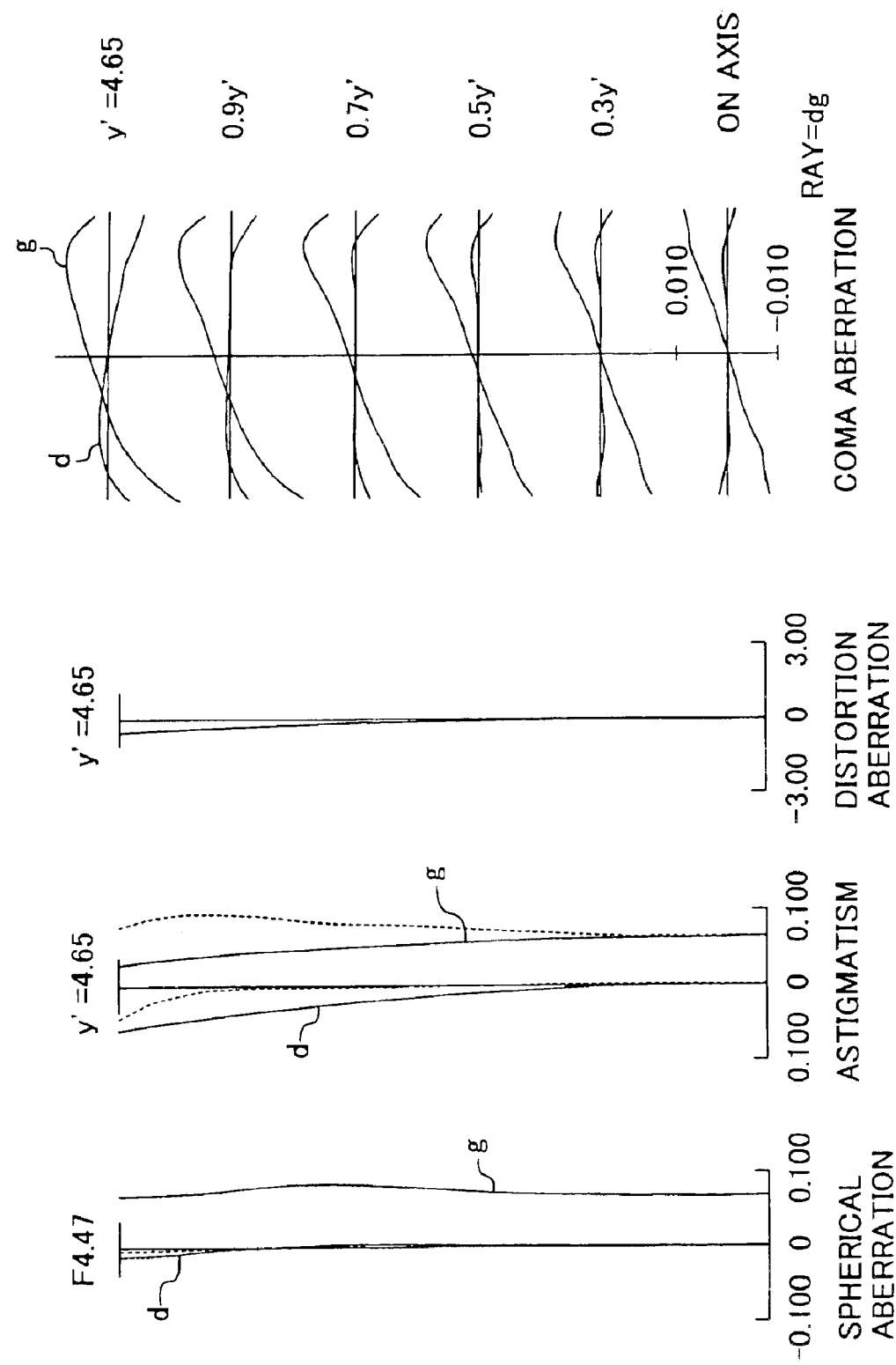
FIG. 9 is an aberration curve diameter in the long focal end of the zoom lens in the embodiment of numeric value 2 of the present invention.

FIG. 7 is an aberration curve diameter in the short focal end of the zoom lens according to the embodiment of numeric value 2, FIG. 8 is an aberration curve diameter in the middle focal length of the zoom lens according to the embodiment of numeric value 2, and FIG. 9 is an aberration curve diameter in the long focal end of the zoom lens according to the embodiment of numeric value 2.

FIG. 3 is a cross sectional view showing a zoom lens in a third embodiment of the present invention. The zoom lens in the third embodiment of the present invention is constituted by a lens 21, a lens 22, a lens 23, a first positive lens 24, a negative lens 25 in the meniscus shape, a second positive lens 26 in the meniscus shape, a third positive lens 27, a lens 28, an aperture stop 29 and a filter 30. In addition, the lens 21, the lens 22 and the lens 23 constitute the first group of lenses L, the first positive lens 24, the negative lens 25, the second positive lens 26 and the third positive lens 27 constitute the second group of lenses M, and the lens 28 constitutes the third group of lenses N. The embodiment of numeric value of those will be described hereunder.

Embodiment of Numeric Value 3 f=5.97–16.88, F=2.75–4.57 ω=39.20–15.32

| Surface No. | R | D | Nd | ν d | Remarks | |
|---|---|---|---|---|---|---|
| 01 | 20.625 | 1.78 | 1.77250 | 49.62 | Lens 21 | ⎫ |
| 02 | 7.896 | 3.50 | | | | ⎪ |
| 03* | −257.596 | 1.66 | 1.53048 | 55.78 | Lens 22 | ⎬ First group of lenses L |
| 04 | 9.380 | 2.79 | | | | ⎪ |
| 05 | 17.958 | 2.21 | 1.71736 | 29.50 | Lens 23 | ⎭ |
| 06 | 4031.046 | Variable (A) | | | | |
| 07 | aperture stop | 1.00 | | | | |

-continued

| Surface No. | R | D | Nd | ν d | Remarks | |
|---|---|---|---|---|---|---|
| 08 | 8.784 | 1.80 | 1.74330 | 49.33 | First positive lens 24 | |
| 09 | 31.431 | 1.00 | | | | |
| 10 | 12.803 | 3.44 | 1.84666 | 23.78 | Negative lens 25 | |
| 11 | 4.614 | 3.76 | 1.48749 | 70.44 | Second positive lens 26 | Second group of lenses M |
| 12 | 10.170 | 0.31 | | | | |
| 13* | 9.785 | 1.92 | 1.53048 | 55.78 | Third positive lens 27 | |
| 14 | 55.076 | Variable (B) | | | | |
| 15* | 31.377 | 2.10 | 1.53048 | 55.78 | Lens 28} Third group of lenses N | |
| 16 | −61.392 | Variable (C) | | | | |
| 17 | ∞ | 3.33 | 1.51680 | 64.20 | Various filters | |
| 18 | ∞ | | | | | |

Aspherical Surface; Fourth Surface
$K=0.0$, $A4=-0.282506\times10^{-3}$, $A6=-0.509455\times10^{-5}$, $A8=0.421360\times10^{-6}$
$A10=-0.245536\times10^{-7}$, $A12=0.613289\times10^{-9}$, $A14=-0.181872\times10^{-11}$
$A16=-0.200488\times10^{-12}$, $A18=0.267509\times10^{-14}$
Aspherical Surface; Eighth Surface
$K=0.0$, $A4=-0.751881\times10^{-4}$, $A6=0.769572\times10^{-6}$, $A8=0.848299\times10^{-8}$, $A10=-0.802058\times10^{-10}$
Aspherical Surface; Thirteenth Surface
$K=0.0$, $A4=0.813495\times10^{-6}$, $A6=0.717205\times10^{-7}$, $A8=-0.819604\times10^{-8}$
$A10=0.304697\times10^{-7}$
Aspherical Surface; Fourteenth Surface
$K=0.0$, $A4=0.342223\times10^{-3}$, $A6=0.805437\times10^{-5}$, $A8=-0.819604\times10^{-8}$
$A10=0.304697\times10^{-7}$
Aspherical Surface; Fifteenth Surface
$K=0.0$, $A4=-0.984535\times10^{-4}$, $A6=0.484064\times10^{-5}$, $A8=0.199016\times10^{-6}$, $A10=0.343781\times10^{-8}$
Variable Interval

| | Short focal end $f = 5.97$ | middle focal length $f = 10.05$ | long focal end $f = 16.88$ |
|---|---|---|---|
| A | 20.787 | 8.684 | 1.501 |
| B | 2.251 | 7.135 | 15.268 |
| C | 3.412 | 3.302 | 3.100 |

Value of Conditional Formula $f_2/f_{2p}=0.655$ $R_c/Y_{max}=0.992$

Figure 10:
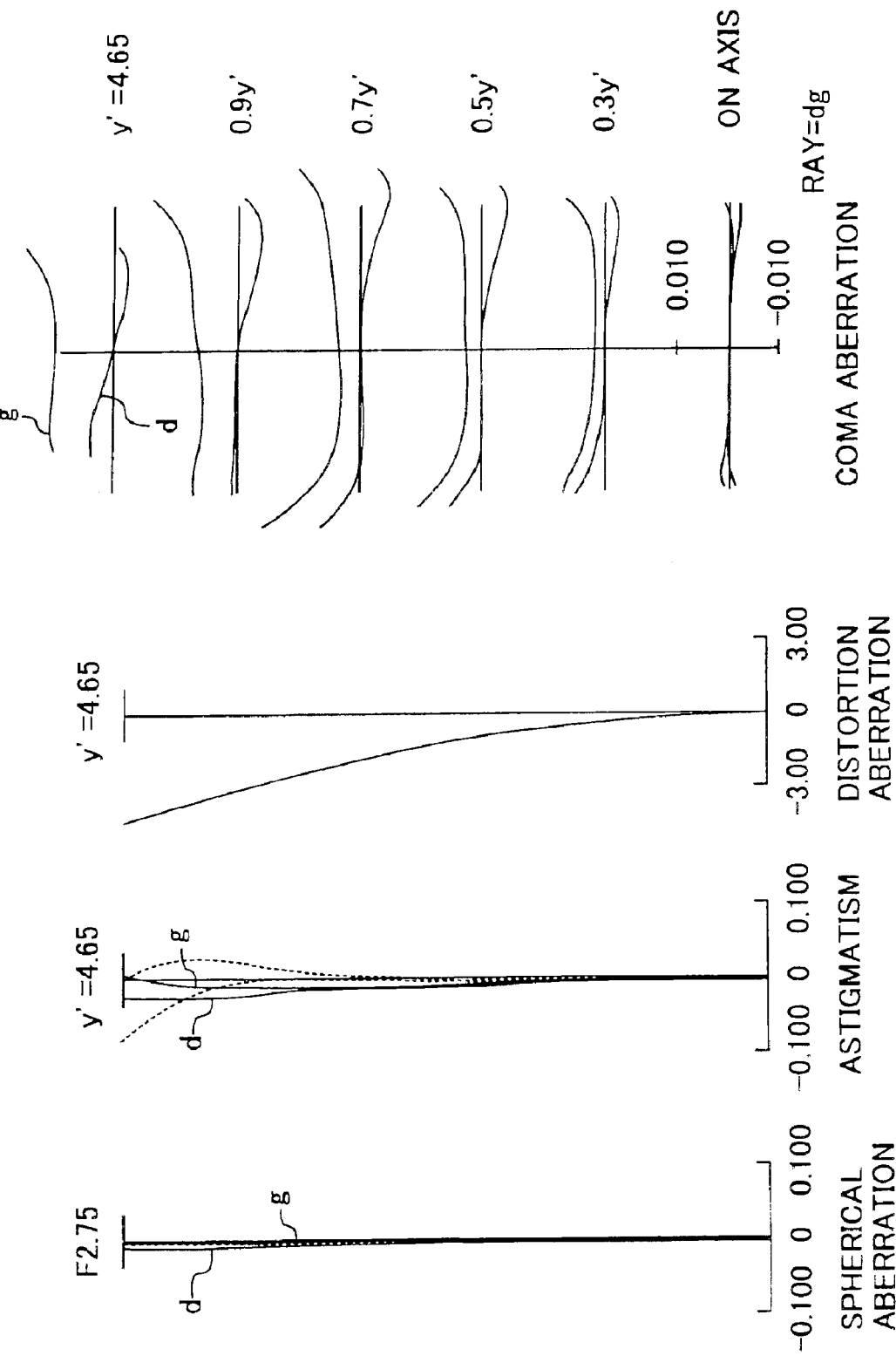
FIG. 10 is an aberration curve diameter in the short focal end of the zoom lens in the embodiment of numeric value 3 of the present invention.
Figure 11:
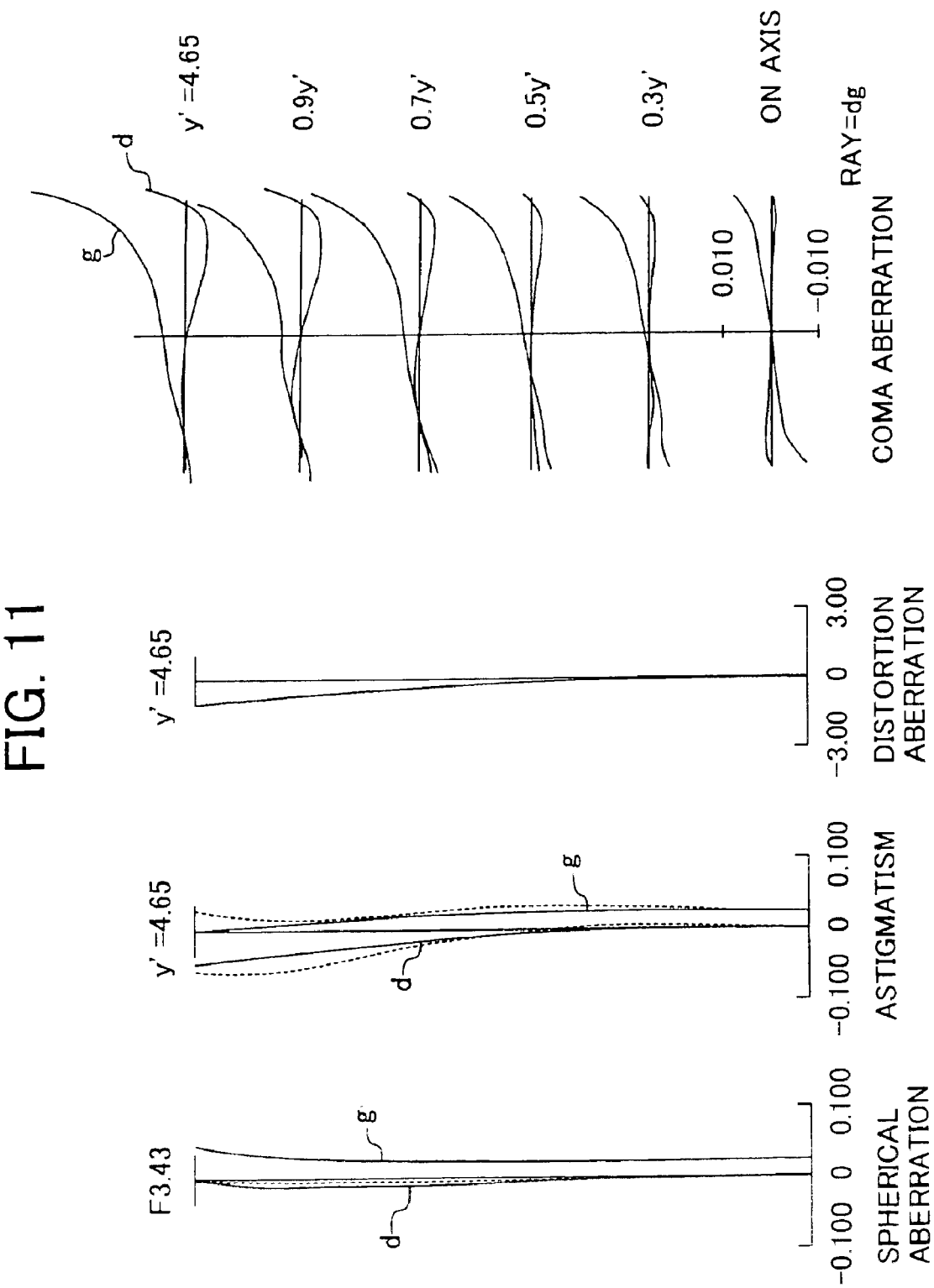
FIG. 11 is an aberration curve diameter in the middle focal length of the zoom lens in the embodiment of numeric value 3 of the present invention.
Figure 12:
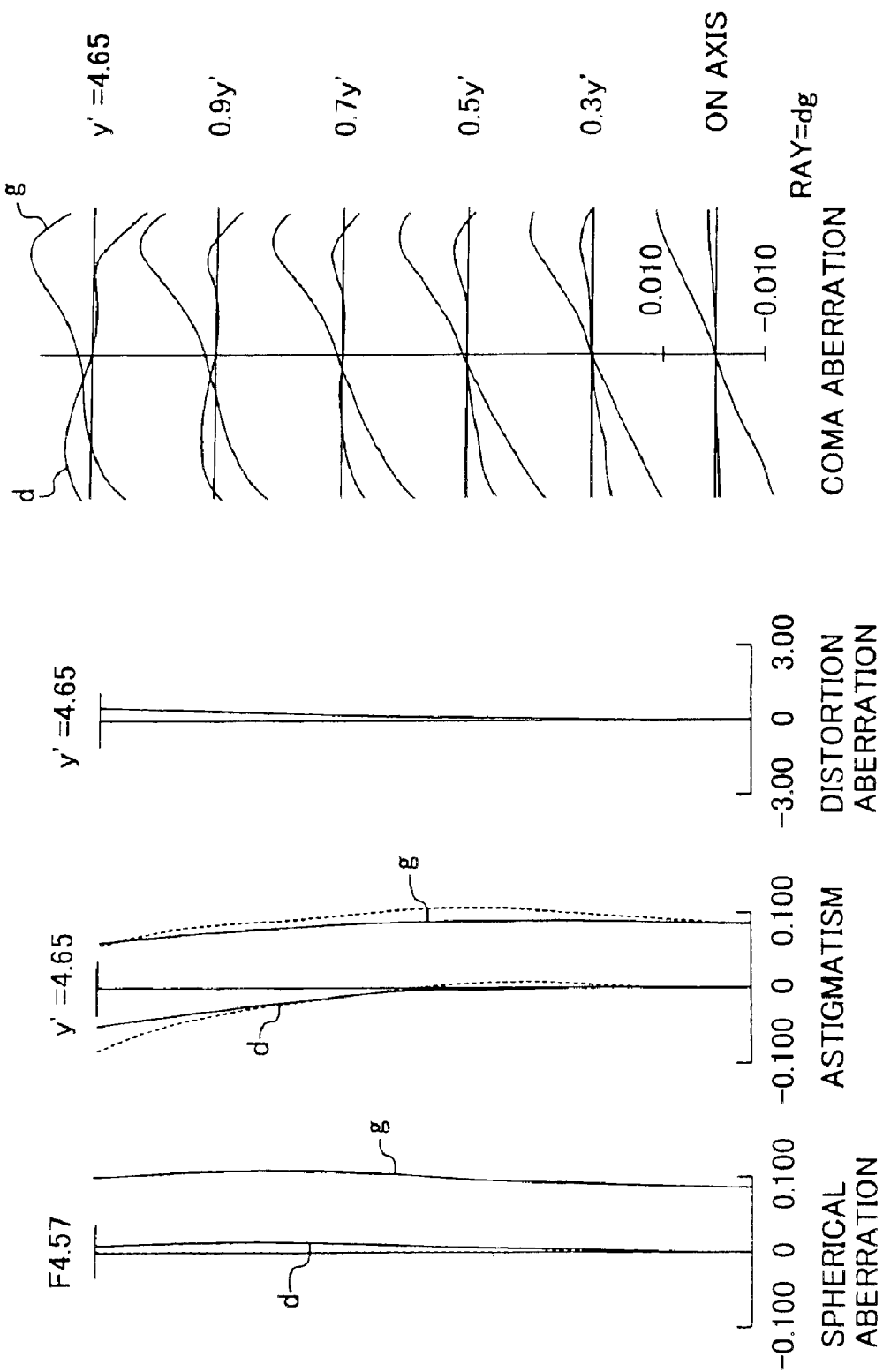
FIG. 12 is an aberration curve diameter in the long focal end of the zoom lens in the embodiment of numeric value 3 of the present invention.

FIG. 10 is an aberration curve diameter in the short focal end of the zoom lens according to the embodiment of numeric value 3, FIG. 11 is an aberration curve diameter in the middle focal length of the zoom lens according to the embodiment of numeric value 3, and FIG. 12 is an aberration curve diameter in the long focal end of the zoom lens according to the embodiment of numeric value 3.

Figure 13A:
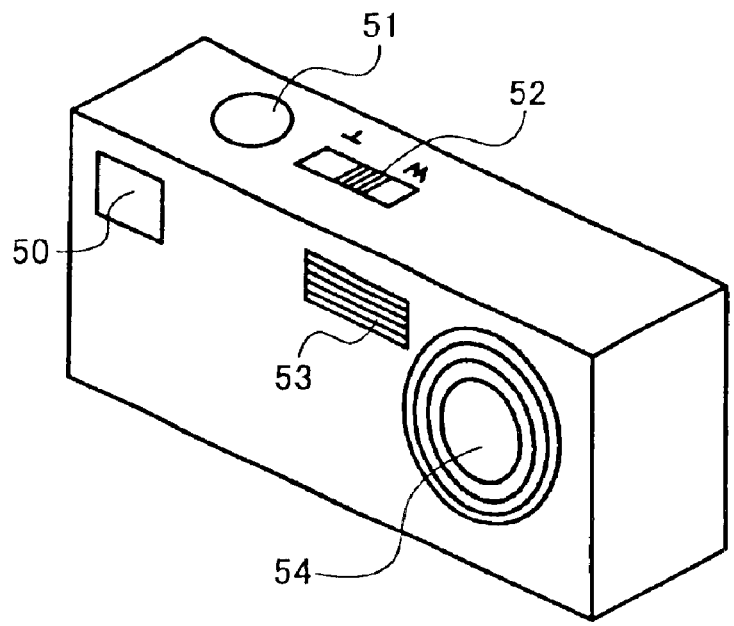
FIG. 13 is an outside view showing one embodiment as a camera (portable information terminal apparatus) of the present invention.
Figure 13B:
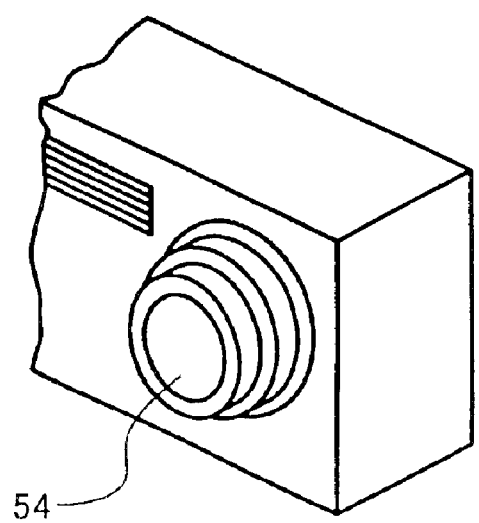
Figure 13C:
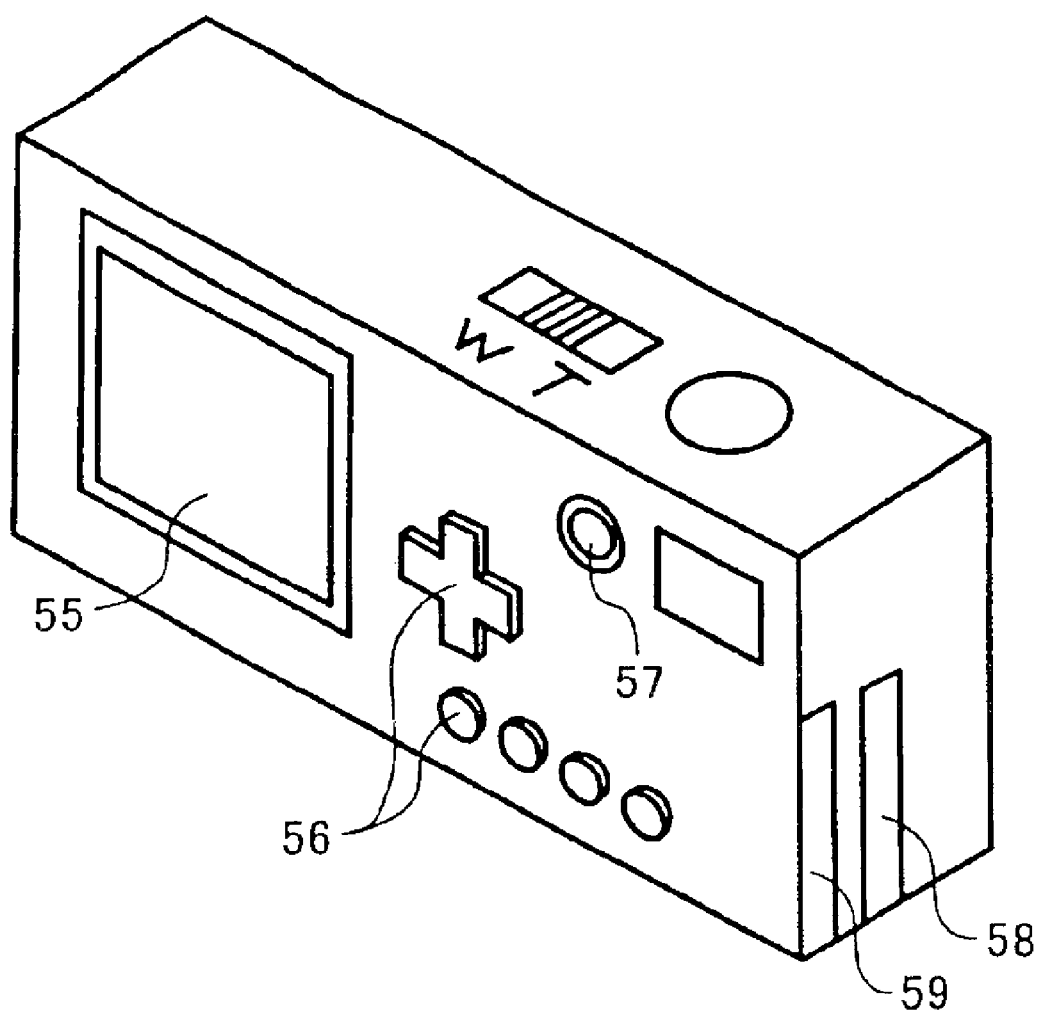

FIGS. 13A, 13B and 13C are perspective views of a camera which uses the zoom lens of the present invention. FIG. 13A is the perspective view seen from front, FIG. 13B is the partial perspective view which a photographing lens 54 is zoomed, and FIG. 13C is the perspective view seen from back. The camera has the photographing lens 54 and a light receiving element (area sensor) which is not shown, and the camera is constituted so as to read out an image of a subject formed by the photographing lens 54 by the light receiving element. The zoom lens described in the embodiment of the present invention is used as the photographing lens 54. When the camera is carried, the photographing lens 54 is in a sunken state as shown in FIG. 13A, and when the user supplies power by operating a power switch 57, a lens barrel is extended out as shown in FIG. 13B. At this time, each group of lenses of the zoom lens inside of the lens barrel is, for example, disposed in the short focal end. The disposition of each of the group of lenses is changed by controlling a zoom lever 52, as a result, the change of magnification to the long focal end can be carried out. At this time, the change of magnification of a viewfinder 50 is also carried out interlocked with a change in the angle of view of the photographing lens 54. In addition, a focusing is performed by a half-pressing of a shutter release button 51. The focusing in the zoom lens described in the present embodiments can be performed by the movement of the aforementioned first group of lenses or the aforementioned third group of lenses, or a movement of the light receiving element. The photographing is performed if the shutter release button 51 is further pressed down. Additionally, an operation button 56 is used when displaying the image stored in a semiconductor memory on a liquid crystal monitor 55, or transmitting outside by using a card or the like. The semiconductor memory and the communication card are used by respectively inserting into slots 58 and 59 which are exclusive or general-purpose.

Figure 14:
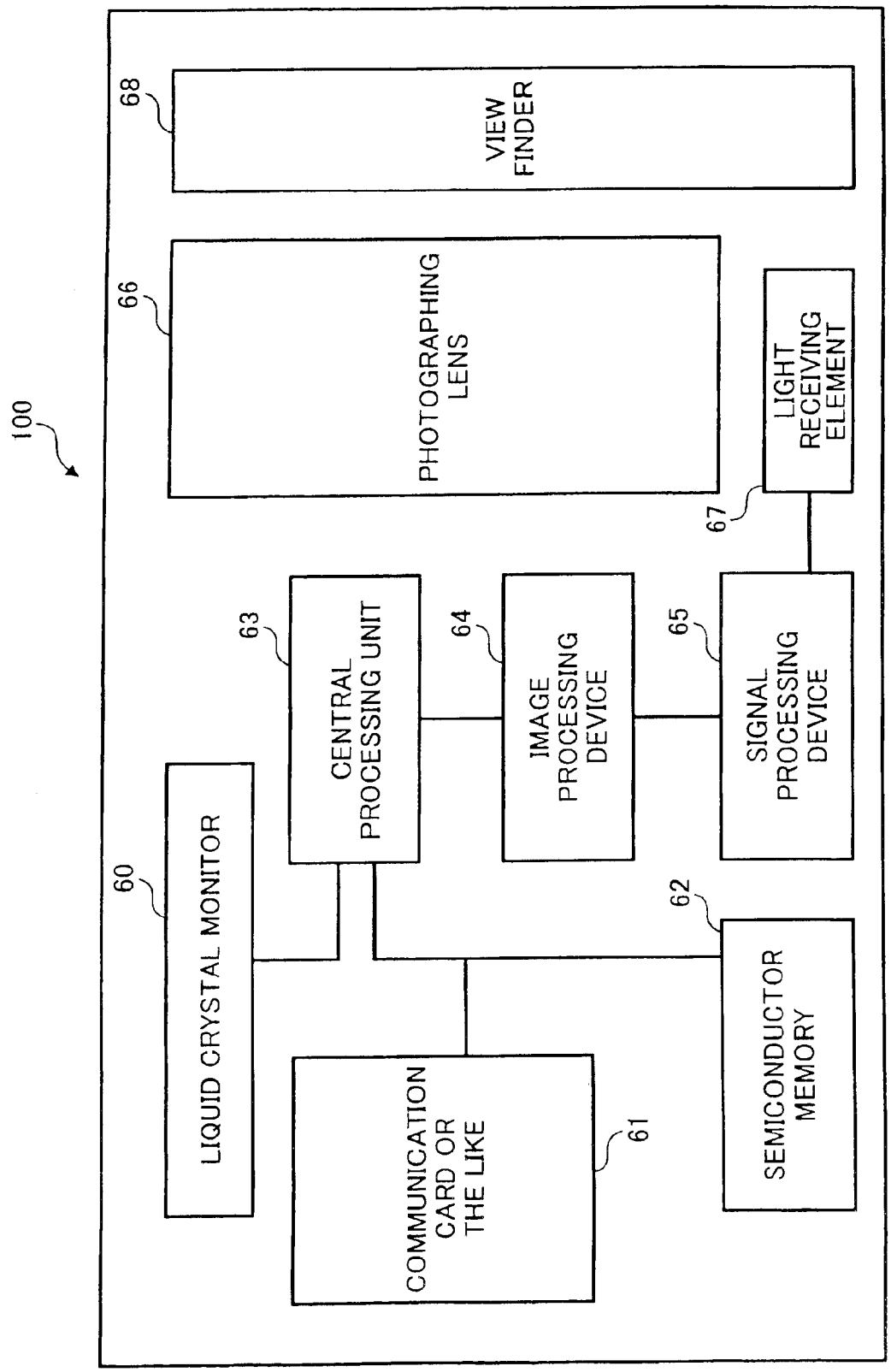
FIG. 14 is a block diagram of an inner structure showing one embodiment as the camera (portable information terminal apparatus) of the present invention.

FIG. 14 is a block diagram showing an inner structure of a camera 100 in the present invention. The light receiving element 67 reads out the image of the subject formed by a photographing lens 66. In addition, an output from a light receiving element 67 is processed by a signal processing device 65 which is controlled by a central processing unit 63, and the processed output is converted into digital information. Image information digitalized by the signal processing device 65 is recorded on the semiconductor memory 62 after being applied with a predetermined image process in an image processing device 64 which is controlled by the central processing unit 63. The liquid crystal monitor 60 is capable of displaying the image in photographing and also displaying the image stored in the semiconductor memory 62. Also, the image stored in the semiconductor memory 62 can be transmitted outside by use of a communication card or the like 61. By the way, the camera 100 is provided with a viewfinder 68 in which the change of magnification is carried out interlocked with the change in the angle of view of the photographing lens 66.

For the camera (portable information terminal apparatus) as described above, the zoom lens in the embodiments 1 to 3 of numeric values in a character of the lens groups can be used as a photographing lens. Therefore, the small sized, high image quality camera (portable information terminal apparatus) which utilizes the light receiving element of 2,000,000 pixels to 4,000,000 pixels can be realized.

As described above, according to one of the present invention, because the plastic aspheric lens is used for the third positive lens of the second group of lenses that is nearest to the image side with a structure of a conventional zoom lens, the small sized camera (portable information terminal apparatus) which is lighter weighted and more convenient to use than the conventional ones and capable of widening the angle of view can be realized while having the high performance and in small size equivalent to or more than the conventional ones.

Also, according to another one of the present invention, because it is designed to satisfy the following conditional formula:

$$0.08 < f_2/f_{2p} < 0.8$$

if the focal length of the aforementioned second group of lenses is $f_2$ and the focal length of the aforementioned third positive lens is $f_{2p}$, the zoom lens which has the high performance and difficult to be influenced by the environmental variation even more can be provided.

Also, according to yet another one of the present invention, because the negative lens in the meniscus shape of the second group of lenses and the second positive lens in the meniscus shape of the image side thereof are jointed, the zoom lens having simpler structure with less performance degradation can be provided.

Also, according to yet another one of the present invention, because it is designed to satisfy the following conditional formula:

$$0.8 < R_c/Y_{max} < 1.2$$

if $R_c$ is the radius of curvature in the jointed surface of the aforementioned second group of lenses, and $Y_{max}$ is the maximum image height, the zoom lens having the high performance and the simple structure can be provided.

Also, according to yet another one of the present invention, because the aperture stop which moves integrally with the second group of lenses is provided and at least the object side surface in the lens at the nearest to the object side of the second group of lenses is set to be aspheric surface, the zoom lens which an aspheric aberration is less can be provided, as a result, the camera (portable information terminal apparatus) having even high image quality can be realized.

Also, according to yet another one of the present invention, because at least one piece of the plastic aspheric lens is provided, the zoom lens which is superior in the aberration correction function can be provided.

Also, according to yet another one of the present invention, because the aforementioned first group of lenses is provided with the plastic aspheric lens and the aforementioned third group of lenses is provided with the plastic aspheric lens, and thereby the plastic aspheric lenses are distributed to each of the group of lenses, the lighter weighted zoom lens can be provided.

Also, according to yet another one of the present invention, because the zoom lens which can be miniaturized even more and has the high performance equivalent to or more than the conventional ones is used for a photographing optical system, the camera which is small in size and has the high image quality can be provided, as a result, the user can photograph the high quality image by using the camera which is superior in portability.

Also, according to yet another one of the present invention, because the zoom lens which can be miniaturized even more and has the high performance equivalent to or more than the conventional ones is used for a photographing optical system of a camera function section, the portable information terminal apparatus which is small in size and has the high image quality can be provided, as a result, the user can photograph the high quality image by using the portable information terminal apparatus which is superior in portability, and can transmit the photographed image to outside.

What is claimed is:

1. A zoom lens comprising:
    a first group of lenses, a second group of lenses and a third group of lenses which are subsequently arranged from a side of an object to a side of an image;
    said first group of lenses having a negative refractive power, said second group of lenses having a positive refractive power and said third group of lenses having a positive refractive power;
    an aperture stop provided at the object side of said second group of lenses;
    a first positive lens;
    a negative lens;
    a second positive lens; and
    a third positive lens
    said first positive lens, negative lens, second positive lens, and third positive lens being subsequently arranged from the object side to the image side in said second group of lenses, wherein
    when a zooming from a short focal end to a long focal end is carried out, said second group of lenses monotonously moves from the image side to the object side, and said first group of lenses moves so as to correct a displacement of a position of image plane in accordance with the zooming; and
    at least said third positive lens positioned nearest to the image side is a plastic aspheric lens.

2. The zoom lens according to claim 1, wherein
    said negative lens is formed by a negative lens of a meniscus shape which faces its convex surface toward the object side, and said second positive lens is formed by a positive lens of a meniscus shape which faces its convex surface toward the object side.

3. The zoom lens according to claim 1, wherein
    a following conditional formula is satisfied:

$$0.08 < f_2/f_{2p} < 0.8$$

if a focal length of said second group of lenses is $f_2$, and the focal length of said third positive lens is $f_{2p}$.

4. The zoom lens according to claim 1, wherein
    at least said negative lens of said second group of lenses and said second positive lens are jointed.

5. The zoom lens according to claim 4, wherein
    a following conditional formula is satisfied:

$$0.8 < R_c/Y_{max} < 1.2$$

if a radius of curvature in a jointed surface of said second group of lenses is $R_c$, and a maximum image height is $Y_{max}$.

6. The zoom lens according to claim 1, wherein
    said aperture stop provided at the object side of said second group of lenses moves integrally with the second group of lenses, and at least a surface of said second group of lenses that is nearest to the object side is an aspheric surface.

7. The zoom lens according to claim 1, wherein at least one piece of plastic aspheric lens, whose both surfaces thereof are aspheric surfaces, is provided.

8. The zoom lens according to claim 1, wherein said first group of lenses is provided with a plastic aspheric lens, and said third group of lenses is provided with a plastic aspheric lens.

9. A camera comprising:

a zoom lens as a photographing optical system;

said zoom lens being comprised of a first group of lenses, a second group of lenses and a third group of lenses which are subsequently arranged from an object side to an image side;

said first group of lenses having a negative refractive power, said second group of lenses having a positive refractive power and said third group of lenses having the positive refractive power;

an aperture stop provided at the object side of said second group of lenses;

when a zooming from a short focal end to a long focal end is carried out, said second group of lenses monotonously moves from the image side to the object side, and said first group of lenses moves so as to correct a displacement of a position of image plane in accordance with the zooming; and a first positive lens, a negative lens, a second positive lens and a third positive lens being subsequently arranged from the object side to the image side in said second group of lenses, wherein at least said third positive lens positioned nearest to the image side is a plastic aspheric lens.

10. A portable information terminal apparatus comprising:

a zoom lens as a photographing optical system of a camera function section;

said zoom lens being comprised of a first group of lenses, a second group of lenses and a third group of lenses which are subsequently arranged from an object side to an image side;

said first group of lenses having a negative refractive power, said second group of lenses having a positive refractive power and said third group of lenses having the positive refractive power;

an aperture stop provided at the object side of said second group of lenses, wherein when a zooming from a short focal end to a long focal end is carried out, said second group of lenses monotonously moves from the image side to the object side, and said first group of lenses moves so as to correct a displacement of a position of image plane in accordance with the zooming; and a first positive lens, a negative lens, a second positive lens and a third positive lens are subsequently arranged from the object side to the image side in said second group of lenses, wherein at least said third positive lens positioned nearest to the image side is a plastic aspheric lens.

* * * * *